United States Patent
Kang (10) Patent No.: US 10,384,809 B2
(45) Date of Patent: Aug. 20, 2019

(54) METHOD AND APPARATUS FOR COMPARING SATELLITE ATTITUDE CONTROL PERFORMANCES

(71) Applicant: Korea Aerospace Research Institute, Daejeon (KR)

(72) Inventor: Woo Yong Kang, Daejeon (KR)

(73) Assignee: KOREA AEROSPACE RESEARCH INSTITUTE, Daejeon (KR)

( * ) Notice: Subject to any disclaimer, the term of this patent is extended or adjusted under 35 U.S.C. 154(b) by 230 days.

(21) Appl. No.: 15/381,202

(22) Filed: Dec. 16, 2016

(65) Prior Publication Data

US 2017/0174367 A1  Jun. 22, 2017

(30) Foreign Application Priority Data

Dec. 17, 2015  (KR) .................. 10-2015-0180999

(51) Int. Cl.
  *B64G 1/24*  (2006.01)
  *B64G 1/10*  (2006.01)
  *B64G 1/36*  (2006.01)
  *B64G 3/00*  (2006.01)

(52) U.S. Cl.
  CPC ............ *B64G 1/24* (2013.01); *B64G 1/10* (2013.01); *B64G 1/36* (2013.01); *B64G 3/00* (2013.01); *B64G 2001/245* (2013.01)

(58) Field of Classification Search
  CPC ... B64G 1/24; B64G 1/10; B64G 3/00; B64G 1/36; B64G 2001/245
  USPC ..................................... 701/1, 13
  See application file for complete search history.

(56) References Cited

U.S. PATENT DOCUMENTS

| | | | | |
|---|---|---|---|---|
| 6,048,366 A * | 4/2000 | Ellis | ............. | G09B 9/00 701/13 |
| 6,089,507 A * | 7/2000 | Parvez | ............. | B64G 1/1085 244/158.8 |
| 6,341,249 B1 * | 1/2002 | Xing | ............. | B64G 1/1085 244/158.8 |
| 6,608,589 B1 * | 8/2003 | Devereux | ............. | G01C 21/00 342/357.29 |
| 6,860,451 B1 * | 3/2005 | Wang | ............. | B64G 1/24 244/164 |

(Continued)

FOREIGN PATENT DOCUMENTS

| KR | 10-1999-0040326 | 10/2000 |
|---|---|---|
| KR | 10-2004-0055552 | 6/2004 |

(Continued)

OTHER PUBLICATIONS

Notice of Allowance received for Korean Patent Application No. 10-2015-0180999, dated Jul. 8, 2016, 5 pages, (untranslated).

(Continued)

*Primary Examiner* — Jaime Figueroa (57) ABSTRACT

Provided is a method of comparing satellite attitude control performances, the method including generating, by a controller, a satellite task execution command, receiving, by an input and output (I/O) unit, a result of a simulation performed on a satellite attitude control by a satellite attitude control simulator based on the satellite task execution command, and transmitting, by the I/O unit, the satellite task execution command to a satellite based on the result of the simulation.

12 Claims, 7 Drawing Sheets

(56) References Cited

U.S. PATENT DOCUMENTS

| | | | | |
|---|---|---|---|---|
| 7,221,316 | B2* | 5/2007 | O'Brien | B64G 1/1014 342/354 |
| 8,346,410 | B2* | 1/2013 | Seo | B64G 1/26 244/158.1 |
| 8,977,391 | B2* | 3/2015 | Vavrina | B64G 7/00 244/158.1 |
| 9,751,645 | B2* | 9/2017 | Jeon | B64G 1/365 |
| 2004/0117074 | A1* | 6/2004 | Wang | B64G 1/24 701/13 |
| 2005/0049764 | A1* | 3/2005 | Wang | B64G 1/28 701/13 |
| 2006/0049315 | A1* | 3/2006 | Patel | B64G 1/26 244/169 |
| 2006/0100846 | A1* | 5/2006 | Lee | B64G 7/00 703/22 |
| 2010/0168938 | A1* | 7/2010 | Seo | B64G 1/26 701/13 |
| 2015/0097084 | A1* | 4/2015 | Szabo | B64G 1/1078 244/171.1 |
| 2015/0219744 | A1* | 8/2015 | Eikenberry | G01S 5/163 348/144 |
| 2016/0021216 | A1* | 1/2016 | Ashworth | B64G 5/00 709/203 |
| 2017/0073088 | A1* | 3/2017 | Jeon | B64G 1/365 |

FOREIGN PATENT DOCUMENTS

| | | |
|---|---|---|
| KR | 10-0554509 | 2/2006 |
| KR | 10-2009-0038734 | 4/2009 |

OTHER PUBLICATIONS

Office Action received for Korean Patent Application No. 10-2015-0180999, dated Apr. 18, 2016, 5 pages, (untranslated).

\* cited by examiner

METHOD AND APPARATUS FOR COMPARING SATELLITE ATTITUDE CONTROL PERFORMANCES

CROSS-REFERENCE TO RELATED APPLICATION

This application claims the priority benefit of Korean Patent Application No. 10-2015-0180999 filed on Dec. 17, 2015, in the Korean Intellectual Property Office, the disclosure of which is incorporated herein by reference for all purposes.

BACKGROUND

1. Field

One or more example embodiments relate to technology for comparing satellite attitude control performances and, more particularly, to technology for comparing satellite attitude control performances by inputting the same task command to a satellite attitude control simulator and an artificial satellite.

2. Description of Related Art

Figure 1:
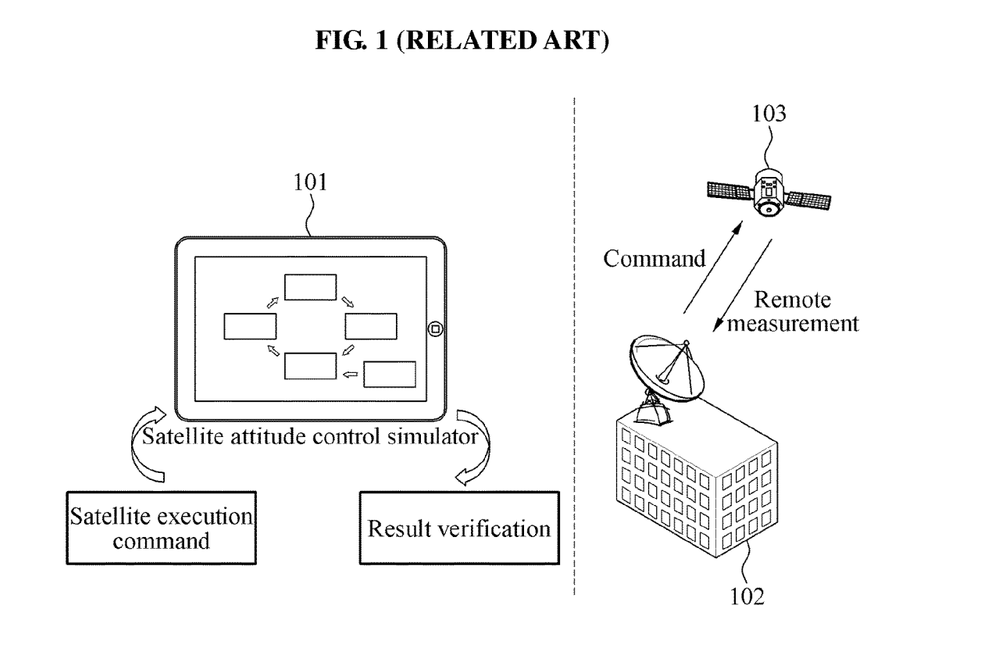
FIG. 1 is a diagram illustrating a satellite attitude control configuration according to a related art.

FIG. 1 is a diagram illustrating a satellite attitude control configuration according to a related art.

In general, a dualistic system including a satellite attitude control simulator 101 and a ground observation post 102, and a satellite 103 may be provided to verify a satellite attitude control performance. The satellite attitude control simulator 101 may function to simulate an attitude of the satellite 103 based on an execution in connection with a dynamic model of the satellite 103, a sensor and a driver attached to the satellite 103, a disturbance affecting the satellite 103, and a satellite attitude control program. Using this, a change in attitude of the satellite 103 based on the execution may be predicted before actual operation of the satellite 103. In a process of development, the satellite attitude control simulator 101 may be used to verify a result of a task command. Also, in a process of operating the satellite 103, the task command may be delivered by the ground observation post 102 and an orbit adjustment result and an attitude may be verified through a remote measurement using the satellite 103.

In this example, when the satellite 103 is out of a predicted attitude or an excessive change in attitude occurs during the operation of the satellite 103, the satellite 103 may enter a safe mode and a predetermined period of time may be needed to enter a normal mode again. Thus, when a new task execution occurs during the operation of the satellite 103, a user may manually use an attitude control performance simulator in a system other than the system operating the satellite 103 to predict a performance so as to perform the task execution.

SUMMARY

According to an aspect, there is provided a method of comparing satellite attitude control performances, the method including generating, by a controller, a satellite task execution command receiving, by an input and output (I/O) unit, a result of a simulation performed on a satellite attitude control by a satellite attitude control simulator based on the satellite task execution command, and transmitting, by the I/O unit, the satellite task execution command to a satellite based on the result of the simulation.

The satellite task execution command may include an input for each of a command and the satellite attitude control simulator.

The transmitting may include transmitting, by the I/O unit, the satellite task execution command to the satellite when the result of the simulation is within a predetermined range.

The method may further include receiving, by the I/O unit, a result obtained by applying the satellite task execution command to the satellite, and comparing, by the processor, the received result to the result of the simulation.

The transmitting may include changing, by the processor, the satellite task execution command when the result of the simulation is beyond a predetermined range.

The method may further include transmitting, by the I/O unit, the changed satellite task execution command to the satellite attitude control simulator.

The satellite task execution command may be associated with at least one of an execution start time and an execution end time, initial attitude and position, an execution angle, or a thruster operating time.

According to another aspect, there is also provided an apparatus for comparing satellite attitude control performances, the apparatus including a processor configured to generate a satellite task execution command and an I/O unit configured to receive a result of a simulation performed on a satellite attitude control by a satellite attitude control simulator based on the satellite task execution command, wherein the I/O unit is configured to transmit the satellite task execution command to a satellite based on the result of the simulation.

When the result of the simulation is within a predetermined range, the I/O unit may be configured to transmit the satellite task execution command to the satellite.

The I/O unit may be configured to receive a result obtained by applying the satellite task execution command to the satellite, and the processor is configured to compare the received result to the result of the simulation.

The processor may be configured to change the satellite task execution command when the result of the simulation is beyond a predetermined range.

The I/O unit may be configured to transmit the changed satellite task execution command to the satellite attitude control simulator.

The satellite task execution command may be associated with at least one of an execution start time and an execution end time, initial attitude and position, an execution angle, or a thruster operating time.

A non-transitory computer-readable medium storing program instructions for controlling a processor to perform the method may be provided.

Additional aspects of example embodiments will be set forth in part in the description which follows and, in part, will be apparent from the description, or may be learned by practice of the disclosure.

BRIEF DESCRIPTION OF THE DRAWINGS

These and/or other aspects, features, and advantages of the invention will become apparent and more readily appreciated from the following description of example embodiments, taken in conjunction with the accompanying drawings of which.

DETAILED DESCRIPTION

Detailed example embodiments of the inventive concepts are disclosed herein. However, specific structural and functional details disclosed herein are merely representative for purposes of describing example embodiments of the inventive concepts. Example embodiments of the inventive concepts may, however, be embodied in many alternate forms and should not be construed as limited to only the embodiments set forth herein.

Terms such as first, second, A, B, (a), (b), and the like may be used herein to describe components. Each of these terminologies is not used to define an essence, order or sequence of a corresponding component but used merely to distinguish the corresponding component from other component(s). For example, a first component may be referred to a second component, and similarly the second component may also be referred to as the first component.

It should be noted that if it is described in the specification that one component is "connected," "coupled," or "joined" to another component, a third component may be "connected," "coupled," and "joined" between the first and second components, although the first component may be directly connected, coupled or joined to the second component.

The terminology used herein is for the purpose of describing particular examples only, and is not to be used to limit the disclosure. As used herein, the terms "a," "an," and "the" are intended to include the plural forms as well, unless the context clearly indicates otherwise. As used herein, the terms "include", "comprise," and "have" specify the presence of stated features, numbers, operations, elements, components, and/or combinations thereof, but do not preclude the presence or addition of one or more other features, numbers, operations, elements, components, and/or combinations thereof.

Unless otherwise defined, all terms, including technical and scientific terms, used herein have the same meaning as commonly understood by one of ordinary skill in the art to which this disclosure pertains. Terms, such as those defined in commonly used dictionaries, are to be interpreted as having a meaning that is consistent with their meaning in the context of the relevant art, and are not to be interpreted in an idealized or overly formal sense unless expressly so defined herein.

Figure 2:
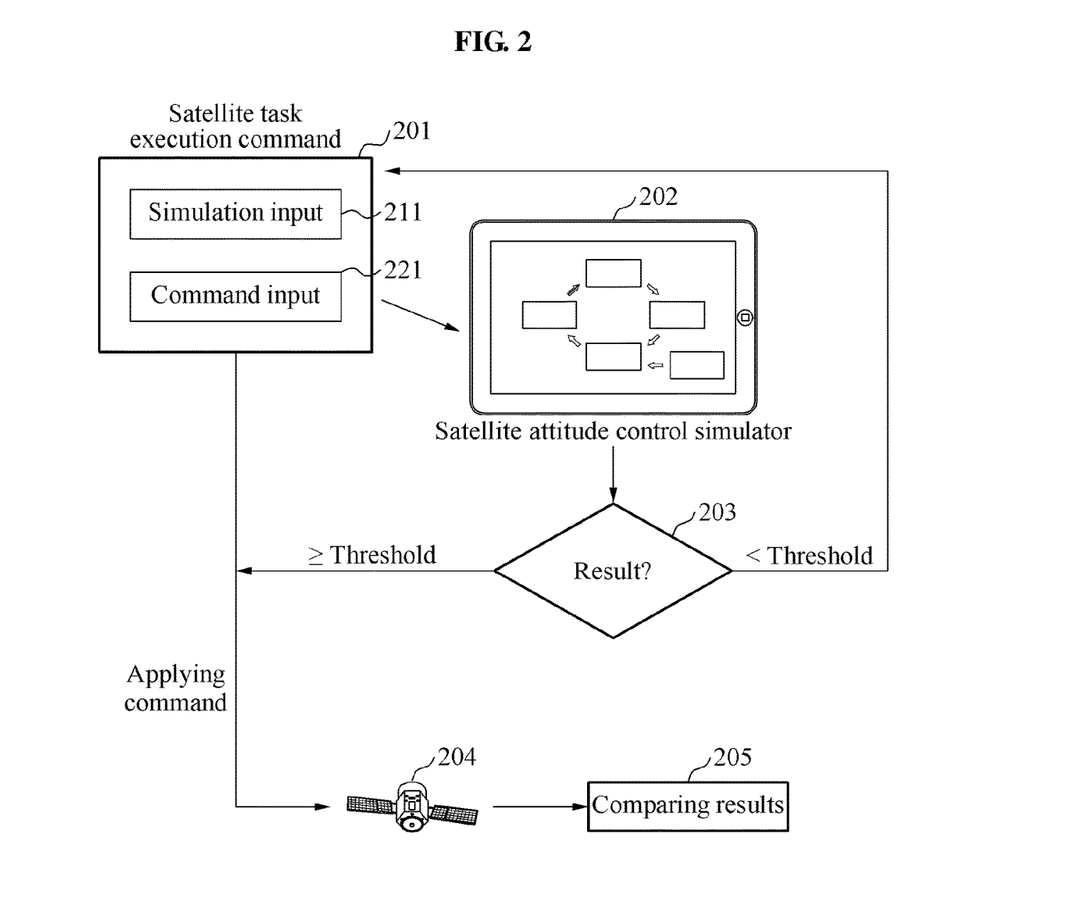
FIG. 2 is a diagram illustrating an example of comparing satellite attitude control performances according to an example embodiment.

FIG. 2 is a diagram illustrating an example of comparing satellite attitude control performances according to an example embodiment.

A processor may generate a satellite task execution command 201. The satellite task execution command may include a simulation input 211 and a command input 221. An example of generating the satellite task execution command will be described in detail with reference to FIG. 4. A simulation input may indicate an input to a satellite attitude control simulator, and a command input may indicate an input to a satellite. When the satellite task execution command 201 is generated, the satellite task execution command 201 may be input to a satellite attitude control simulator 202. In this example, the simulation input 211 of the satellite task execution command 201 may be associated with the satellite attitude control simulator 202 that simulate an attitude of a satellite based on an execution in connection with a dynamic model of the satellite, a sensor and a server attached to the satellite, a disturbance affecting the satellite, and a satellite attitude control program. Thereafter, a simulation result may be extracted from a simulator and the extracted simulation result may be verified in operation 203. When the simulation result is greater than or equal to a threshold, the satellite task execution command may be applied to a satellite 204. In this example, the command input of the satellite task execution command 201 may be applied to the satellite 204, and a satellite attitude control performance comparing apparatus may receive a result of application result to the satellite 204. When the result of application is received, a comparison 205 between the result of application and the simulation result may be performed. Through this, whether a satellite task execution is performed as predicted may be verified.

With respect to a satellite on which the satellite task execution is not performed as predicted, it is predicted that a problem occurs in modeling of the satellite such as a dynamic model of the satellite, a sensor and a server attached to the satellite, a disturbance affecting the satellite, and a satellite attitude control program so as to be applied to detect and determine a defection of the satellite.

Figure 3:
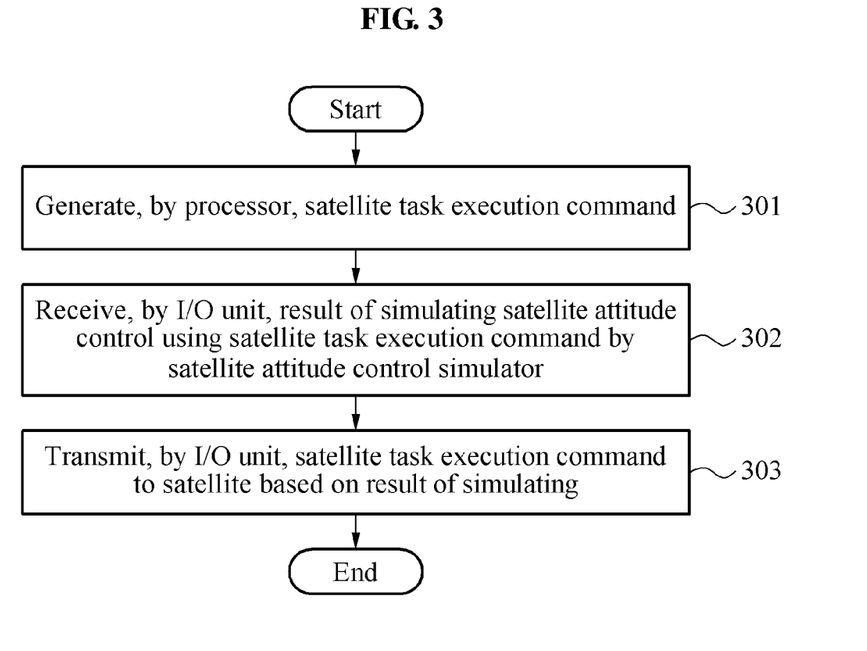
FIG. 3 is a flowchart illustrating an example of a method of comparing satellite attitude control performances according to an example embodiment.

FIG. 3 is a flowchart illustrating an example of a method of comparing satellite attitude control performances according to an example embodiment.

Figure 4:
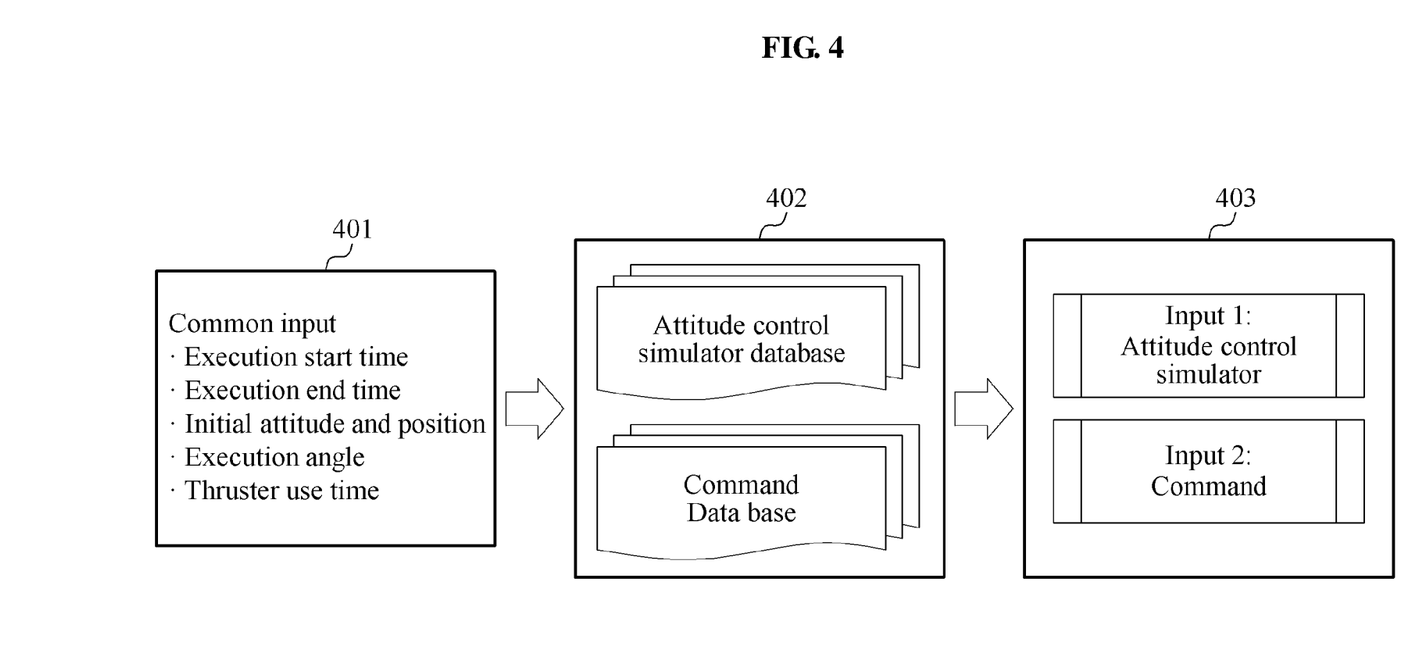
FIG. 4 is a diagram illustrating an example of generating a satellite task execution command according to an example embodiment.

In operation 301, a processor may generate a satellite task execution command. A task to be executed by a satellite may be designed in a ground-controlled system in response to a request from a user of the satellite. To operate the satellite based on a satellite task schedule designed in such process, a satellite command recognizable by the satellite may be transmitted from the ground-controlled system to the satellite. In this example, the satellite command to be transmitted to the satellite may be generated based on the satellite task schedule. Also, the satellite task execution command corresponding to a result of designing the satellite command may be converted into a radio signal and transmitted to the satellite when a low-orbit satellite passes a control station. The satellite task execution command may include, for example, an orbit adjustment and an attitude change of the satellite. A task execution command for various attitudes may be determined based on a target spot. In response to the task execution command, a command set may be transmitted, and an orbit change may be performed using a thruster of the satellite. The satellite task execution command may be automatically generated in response to an input value including, for example, a ground target point and a satellite location. The satellite may perform the task execution in a predetermined time in response to the satellite task execution command. In an example embodiment, the satellite task execution command may include an input for each of the satellite and the satellite attitude control simulator. FIG. 4 is a diagram illustrating an example of generating a satellite task execution command according to an example embodiment. Referring to FIG. 4, a common input 401 may be applied to each of a command input and an input for an attitude control simulator. An input format of a satellite task execution command applied to a satellite in real time may be different from an input format of the satellite task execution command applied to a satellite attitude control simulator. As illustrated in FIG. 4, the common input 401 may be, but not limited to, associated with an execution start time, an execution end time, initial attitude and position, an execution angle, and a thruster use time. Also, the common input 401 may be associated with various factors as well as the aforementioned factors. When an input value of the common input 401 is input to a processor, a satellite execution command format appropriate for the satellite task execution command and the satellite attitude control simulator may be generated. A database 402 may include an attitude control simulator database and a command database. The database 402 may include information used for generating an input for a command and an input for the attitude control simulator. Also, the processor may extract information on the common input 401 from the database 402 and generate a satellite task execution command 403. As described above, the satellite task execution command may include inputs for the command and the attitude control simulator, and the inputs may be applied to the satellite and the satellite attitude control simulator, respectively. In operation 302, an I/O unit may receive a result of simulating a satellite attitude control using the satellite task execution command by the satellite attitude control simulator. In operation 303, the I/O unit may transmit the satellite task execution command to the satellite based on the result of simulating. In the satellite attitude control performance comparing method, the initial attitude and the position of the satellite and a task command to be actually performed may be identically input in the same system. Through this, an actual execution may be predicted and a reliability of operating the satellite may also increase. According to an example embodiment, the aforementioned operation of transmitting the satellite task execution command to the satellite may include an operation that the I/O unit transmits the satellite task execution command to the satellite when the result of simulating is within a predetermined range. When an execution of the satellite is terminated, and when data, for example, an attitude and an angular velocity associated with the execution of the satellite is within the predetermined range, the I/O unit may transmit the satellite task execution command to directly apply the satellite task execution command to the satellite. The range may be set by a user. The satellite task execution command may be transmitted to the satellite to actually perform the execution of the satellite only when the result of simulating satisfies the range.

Figure 5:
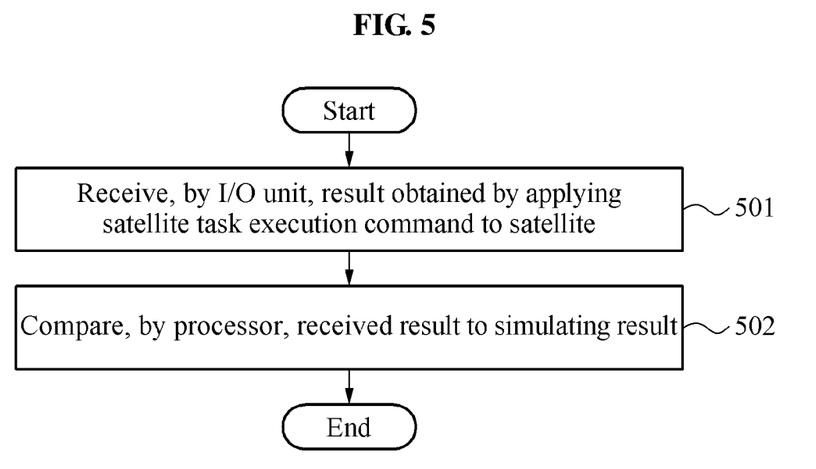
FIG. 5 is a flowchart illustrating another example of a method of comparing satellite attitude control performances according to an example embodiment.

FIG. 5 is a flowchart illustrating another example of a method of comparing satellite attitude control performances according to an example embodiment.

In operation 501, an I/O unit may receive a result obtained by applying a satellite task execution command to a satellite. When a result of simulation corresponding to an attitude control performance satisfies a predetermined range, and when the satellite task execution command is applied to the satellite, the I/O unit may receive a result thereof. In operation 502, a processor may compare the received result to a simulating result. The processor may compare data stored in the satellite after a satellite task execution is terminated to data predicted by a satellite attitude control simulator, and verify whether the satellite task execution is performed as predicted.

Figure 6:
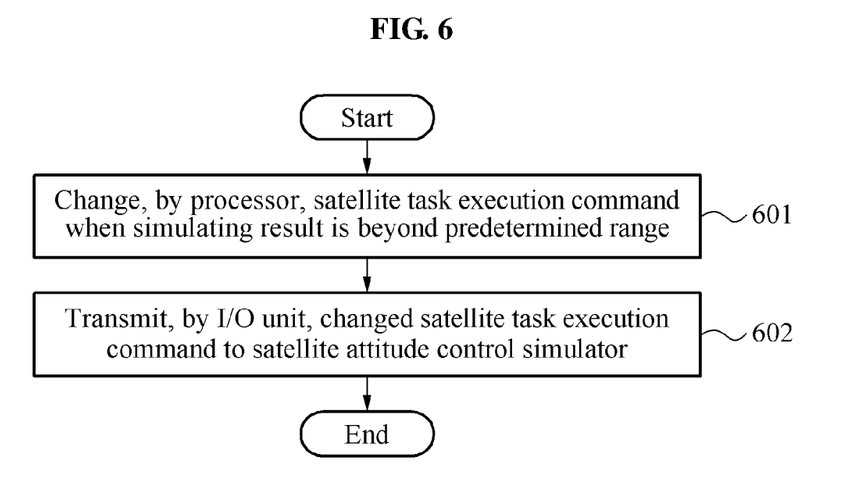
FIG. 6 is a flowchart illustrating still another example of a method of comparing satellite attitude control performances according to an example embodiment.

FIG. 6 is a flowchart illustrating still another example of a method of comparing satellite attitude control performances according to an example embodiment.

In operation 601, a processor may change a satellite task execution command when a simulating result is beyond a predetermined range. In operation 602, an I/O unit may transmit the changed satellite task execution command to a satellite attitude control simulator. In this example, when the simulating result does not satisfy the predetermined range, the satellite task execution command may be changed or updated to provide a feedback on the satellite task execution command. Through this, a satellite attitude control simulation may be performed based on an automatic feedback in contrast to a satellite attitude control simulation that is performed manually.

Figure 7:
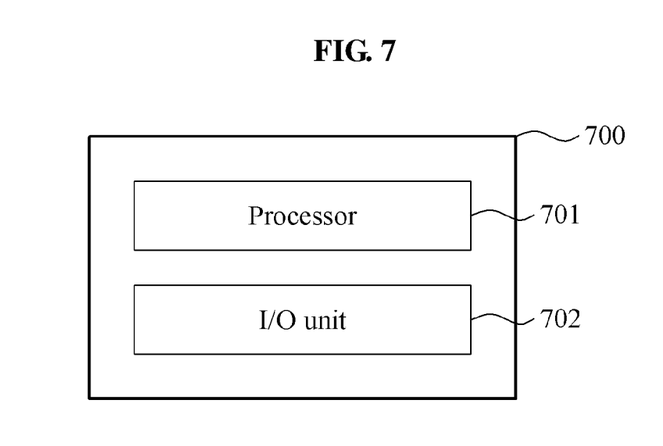
FIG. 7 is a block diagram illustrating an apparatus for comparing satellite attitude control performances according to an example embodiment.

FIG. 7 is a block diagram illustrating an apparatus 700 for comparing satellite attitude control performances according to an example embodiment.

An apparatus 700 for comparing satellite attitude control performances may include a processor 701 and an I/O unit 702. The processor 701 may generate a satellite task execution command. A task to be executed by a satellite may be designed in a ground-controlled system in response to a request from a user of the satellite. To operate the satellite based on a satellite task schedule designed in such process, a satellite command recognizable by the satellite may be transmitted from the ground-controlled system to the satellite. In this example, the satellite command to be transmitted to the satellite may be generated based on the satellite task schedule. Also, the satellite task execution command corresponding to a result of designing the satellite command may be converted into a radio signal and transmitted to the satellite when a low-orbit satellite passes a control station. The satellite task execution command may include, for example, an orbit adjustment and an attitude change of the satellite. A task execution command for various attitudes may be determined based on a target spot. In response to the task execution command, a command set may be transmitted, and changing of an orbit may be performed using a thruster of the satellite. The satellite task execution command may be automatically generated in response to an input value including, for example, a ground target point and a satellite location. The satellite may perform the task execution in a predetermined time in response to the satellite task execution command. In an example embodiment, the satellite task execution command may include an input for each of the satellite and the satellite attitude control simulator. As described above, a common input may be applied to each of a command input and an input for an attitude control simulator. An input format of a satellite task execution command applied to a satellite in real time may be different from an input format of the satellite task execution command applied to a satellite attitude control simulator. The common input may be, but not limited to, associated with an execution start time, an execution end time, initial attitude and position, an execution angle, and a thruster use time. Also, the common input may be associated with various factors as well as the aforementioned factors. When an input value of the common input is input to the processor 701, a satellite execution command format appropriate for the satellite task execution command and the satellite attitude control simulator may be generated. A database may include an attitude control simulator database and a command database. The database may include information used for generating an input for a command and an input for the attitude control simulator. Also, the processor 701 may extract information on the common input from the database and generate the satellite task execution command. As described above, the satellite task execution command may include inputs for the command and the attitude control simulator, and the inputs may be applied to the satellite and the satellite attitude control simulator, respectively. The I/O unit 702 may receive a result of simulating a satellite attitude control using the satellite task execution command by the satellite attitude control simulator. When the satellite attitude control simulator performs simulation of a satellite attitude control in response to receiving the satellite task execution command, the I/O unit 702 may receive a simulation result. The I/O unit 702 may transmit the satellite task execution command to the satellite based on the result of simulating. In the satellite attitude control performance comparing method, the initial attitude and the position of the satellite and a task command to be actually performed may be identically input in the same system. Through this, an actual execution may be predicted and a reliability of operating the satellite may also increase. According to an example embodiment, when the result of simulating is within a predetermined range, the I/O unit 702 may transmit the satellite task execution command to the satellite. When an execution of the satellite is terminated, and when data, for example, an attitude and an angular velocity associated with the execution of the satellite is within the predetermined range, the I/O unit 702 may transmit the satellite task execution command to directly apply the satellite task execution command to the satellite. The range may be set by a user. The satellite task execution command may be transmitted to the satellite to actually perform the execution of the satellite only when the result of simulating satisfies the range.

The I/O unit 702 may receive a result obtained by applying the satellite task execution command to the satellite. Also, the processor 701 may compare the received result to the result of simulating. The processor 701 may compare data stored in the satellite after a satellite task execution is terminated to data predicted by a satellite attitude control simulator, and verify whether the satellite task execution is performed as predicted.

The processor 701 may change a satellite task execution command when the result of simulating is beyond the predetermined range. The I/O unit 702 may transmit the changed satellite task execution command to the satellite attitude control simulator. When the result of simulating does not satisfy the predetermined range, the satellite task execution command may be changed or updated to provide a feedback on the satellite task execution command The units and/or modules described herein may be implemented using hardware components and software components. For example, the hardware components may include microphones, amplifiers, band-pass filters, audio to digital convertors, and processing devices. A processing device may be implemented using one or more hardware device configured to carry out and/or execute program code by performing arithmetical, logical, and input/output operations. The processing device(s) may include a processor, a controller and an arithmetic logic unit, a digital signal processor, a microcomputer, a field programmable array, a programmable logic unit, a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such a parallel processors.

The software may include a computer program, a piece of code, an instruction, or some combination thereof, to independently or collectively instruct and/or configure the processing device to operate as desired, thereby transforming the processing device into a special purpose processor. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. The software and data may be stored by one or more non-transitory computer readable recording mediums.

The methods according to the above-described example embodiments may be recorded in non-transitory computer-readable media including program instructions to implement various operations of the above-described example embodiments. The media may also include, alone or in combination with the program instructions, data files, data structures, and the like. The program instructions recorded on the media may be those specially designed and constructed for the purposes of example embodiments, or they may be of the kind well-known and available to those having skill in the computer software arts. Examples of non-transitory computer-readable media include magnetic media such as hard disks, floppy disks, and magnetic tape; optical media such as CD-ROM discs, DVDs, and/or Blue-ray discs; magneto-optical media such as optical discs; and hardware devices that are specially configured to store and perform program instructions, such as read-only memory (ROM), random access memory (RAM), flash memory (e.g., USB flash drives, memory cards, memory sticks, etc.), and the like. Examples of program instructions include both machine code, such as produced by a compiler, and files containing higher level code that may be executed by the computer using an interpreter. The above-described devices may be configured to act as one or more software modules in order to perform the operations of the above-described example embodiments, or vice versa.

A number of example embodiments have been described above. Nevertheless, it should be understood that various modifications may be made to these example embodiments. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A method of comparing satellite attitude control performances, the method comprising:
generating, by a controller, a satellite task execution command;
receiving, by an input and output (I/O) unit, a result of a simulation performed on a satellite attitude control by a satellite attitude control simulator based on the satellite task execution command; and transmitting, by the I/O unit, the satellite task execution command to a satellite, responsive to a comparison of the result of the simulation with a predetermined parameter, being within a predetermined range.

2. The method of claim 1, wherein the satellite task execution command includes an input for each of a command and the satellite attitude control simulator.

3. The method of claim 1, further comprising:
receiving, by the I/O unit, a result obtained by applying the satellite task execution command to the satellite; and
comparing, by the processor, the received result to the result of the simulation, to feedback update the satellite task execution command.

4. The method of claim 1, wherein the transmitting includes changing, by the processor, the satellite task execution command when the result of the simulation is beyond a predetermined range.

5. The method of claim 4, further comprising:
transmitting, by the I/O unit, the changed satellite task execution command to the satellite attitude control simulator.

6. The method of claim 1, wherein the satellite task execution command is associated with at least one of an execution start time and an execution end time, initial attitude and position, an execution angle, or a thruster operating time.

7. An apparatus for comparing satellite attitude control performances, the apparatus comprising:
a processor configured to generate a satellite task execution command; and
an input and output (I/O) unit configured to receive a result of a simulation performed on a satellite attitude control by a satellite attitude control simulator based on the satellite task execution command,
wherein the I/O unit is configured to transmit the satellite task execution command to a satellite, responsive to a comparison of the result of the simulation with a predetermined parameter, being within a predetermined range.

8. The apparatus of claim 7, wherein the I/O unit is configured to receive a result obtained by applying the satellite task execution command to the satellite, and the processor is configured to compare the received result to the result of the simulation, to feedback update the satellite task execution command.

9. The apparatus of claim 7, wherein the processor is configured to change the satellite task execution command when the result of the simulation is beyond a predetermined range.

10. The apparatus of claim 9, wherein the I/O unit is configured to transmit the changed satellite task execution command to the satellite attitude control simulator.

11. The apparatus of claim 7, wherein the satellite task execution command is associated with at least one of an execution start time and an execution end time, initial attitude and position, an execution angle, or a thruster operating time.

12. A non-transitory computer-readable medium storing program instructions for controlling a processor to perform a method of comparing satellite attitude control performances, the method comprising:
generating, by a controller, a satellite task execution command;
receiving, by an input and output (I/O) unit, a result of a simulation performed on a satellite attitude control by a satellite attitude control simulator based on the satellite task execution command; and
transmitting, by the I/O unit, the satellite task execution command to a satellite, responsive to a comparison of the result of the simulation with a predetermined parameter, being within a predetermined range.

* * * * *